July 4, 1939.   H. D. SCHRIER   2,164,354
CONTAINER
Filed Sept. 8, 1936

Harold D. Schrier, INVENTOR.
BY
Barnwell R. King, ATTORNEY.

Patented July 4, 1939

2,164,354

UNITED STATES PATENT OFFICE 2,164,354

CONTAINER

Harold D. Schrier, Kalamazoo, Mich.

Application September 8, 1936, Serial No. 99,746

8 Claims. (Cl. 229—3.5)

This invention relates to containers and more particularly to that class of containers which are made wholly or partly of paper board.

The main objects of my invention are:

First, to provide an inexpensive container which is especially well adapted for consumer liquids, such as oil, beer, milk and the like.

Second, to provide an improved method of making containers.

Third, to provide improved window means in an otherwise opaque container exposing the contents thereof to view.

Fourth, to provide a container which is sealed until opened and which when once opened, is destroyed for re-use.

Fifth, to provide an improved process of integrally combining paper board and transparent cellulose in the making of a container for liquids.

Other objects of this invention, not at this time more particularly enumerated, will be understood from the following detailed description.

Illustrative embodiments disclosing the improvements in containers made according to my invention, are disclosed in the accompanying drawing, in which.

Figure 1:
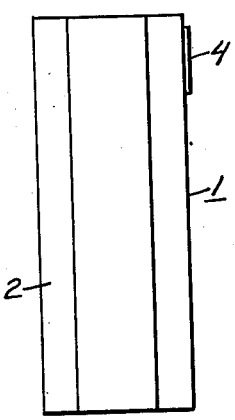
Fig. 1 is a view in elevation of a container of octagonal cross-sectional shape.

The ideal container for consumer liquids, such as oil, beer, milk and the like, is one which is stain-proof, moisture-proof, water-proof, grease-proof, oil-proof, washable, heat-proof, tamper-proof, non-reusable, and disposable by burning. Further, the ideal container is provided with means permitting an inspection of the contents, and is strong, yet inexpensive. I provide a container comprising paper board and cellulose which satisfies the foregoing requirements of the ideal container.

Referring to the drawing, 1 is a container comprising a rectangular paper board blank conformed to provide an octagonal tubular container body 2 having open ends, and a wall opening. A coating of cellulose material covers the inner and outer surfaces of the container body and merges into a transparent end wall 3 at each end of the container body. The wall opening is sealed by a closure patch 4 of paper which is coated on both sides with the cellulose material.

The cellulose material which I prefer to use, is plastic, regenerated cellulose and contains a solvent which renders the material liquid for application to the paper board and for molding to form the end members or walls of the container body. Such cellulose is an excellent adhesive and not only holds the overlapping parts of the container in place, but greatly strengthens the structure of the finished container. The cellulose, when hard, is transparent, permitting one to look through the container from end to end. With translucent liquids the effect is startling and pleasing, and the consumer may assure himself that the liquid in the container is pure and of full measure.

Figure 2:
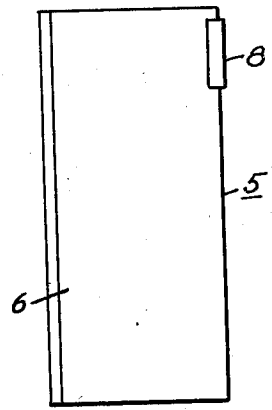
Fig. 2 is a view in elevation of a cylindrical container.
Figure 5:
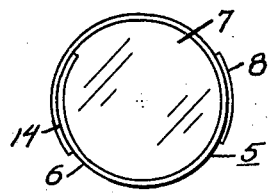
Fig. 5 is a top plan view of the container shown in Fig. 2.

Referring to Figs. 2 and 5, the container 5 has a cylindrical body 6 formed by rolling a rectangular blank of paper board on itself and securing the opposite ends together in overlapping relation. At each end of the container is a transparent pane 7. The end panes are preferably molded in place and consist of regenerated cellulose integrally united with the cellulose coating covering the inner and outer surfaces of the container body. The wall opening 13, through which the container is filled, is sealed by the closure patch 8.

The cellulose coating provides a glazed film on the paper board which is united with and protects the paper fiber from the deleterious effects of the contents. The cellulose also penetrates the paper fiber and strengthens the board to a remarkable degree.

The container will withstand a temperature of 650 degrees F. without charring, yet it may be readily destroyed by burning. The end panes of my container, while tough and strong, may be readily punctured with a sharp instrument to drain the contents. Once punctured however, the container cannot be sealed again. This is a very desirable feature in oil containers where there is a great temptation to refill high grade cans with low grade oil.

Figure 3:
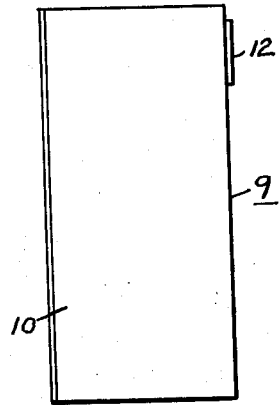
Fig. 3 is a view in elevation of a container of square cross-sectional shape.
Figure 4:
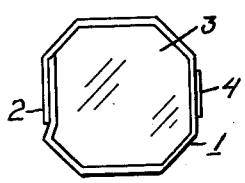
Fig. 4 is a top plan view of the container shown in Fig. 1.
Figure 6:
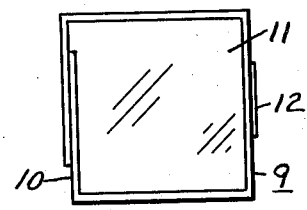
Fig. 6 is a top plan view of the container shown in Fig. 3.

Referring to Figs. 3 and 6, the container 9 has a square body 10 consisting of a paper board blank creased and set up to form a tube. Each end wall consists of a transparent pane 11 molded in place and constituting an integral part of the container. The filling opening is sealed by a closure patch 12.

The method of making my containers permits a wide variation in the crosssectional shape of the container body. I have shown three different cross sectional shapes by way of illustration. The desired cross sectional shape may be selected in accordance with the relative importance of the saving of packing space and container material.

The method I prefer to use in making my containers is as follows: A rectangular blank of paper board is first cut to the proper dimensions and to provide an opening 13, Fig. 7, therein. The blank is then rolled on itself to provide the tubular container body 6 by securing the opposite ends in overlapping relation at 14. The inner and outer surfaces of the container body are coated with the cellulose material, the latter preferably constituting the adhesive which secures the overlapping parts together at 14. The paper board may be coated with the cellulose before or after the container body is formed.

The cellulose end walls or panes 7, 7 are then molded in place, the cellulose of the end walls integrally uniting with container body and with the cellulose film covering the surfaces of the container body.

I prefer to mold the end walls by placing the container body upright on a flat surface and then pouring sufficient cellulose in its plastic or liquid state on such flat surface and within the container body. After an end pane is thus molded, the container is turned upside down and the operation repeated by introducing the cellulose through the opening 13. This results in a container of stout construction, integrally sealed throughout, and provided with the wall opening 13.

Figure 7:
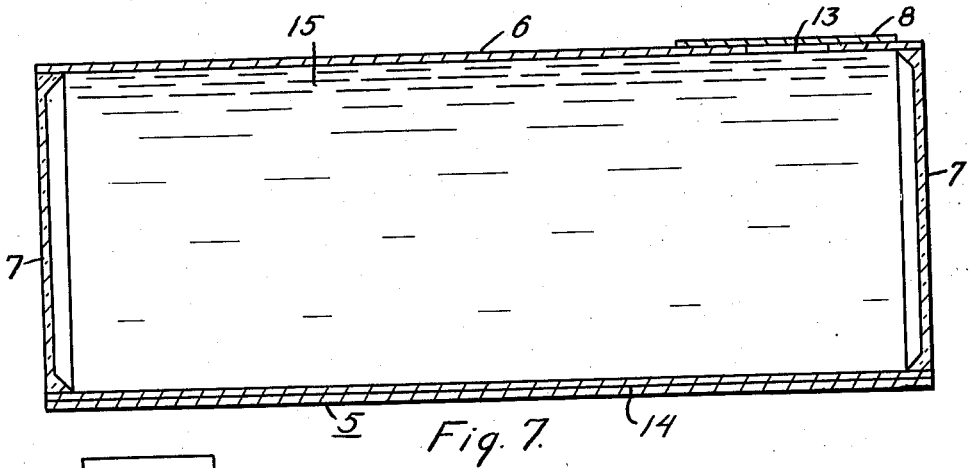
Fig. 7 is a view in longitudinal cross-section of the container shown in Figs. 2 and 5.

The container thus formed is placed in the position shown in Fig. 7 and filled with a liquid 15 through the opening 13. Finally the closure patch 8, preferably of paper board coated on both sides with cellulose, is applied to the container body to seal the opening 13. The filled container is now ready for shipment and sale to the consumer.

In the case of oil or beer the filled container when held to the light with the transparent end panes opposite each other, permits a revealing "X-ray" inspection of the contents which facilitates the sale of the product. I believe that this important feature is new in paper containers for liquids.

Figure 8:
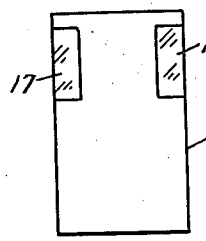
Fig. 8 is a view in elevation of a modification having windows in opposite side walls instead of opposite ends of the container.
Figure 9:
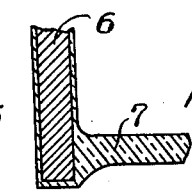
Fig. 9 is an enlarged fragmentary sectional view showing the corner construction of the container shown in Fig. 7.

Referring to Fig. 8, if desired, the container 16 may be provided with the transparent panes 17, 17 in opposite side walls instead of in opposite ends. Or only one window may be provided, as in the case of fiber milk bottles. The window is preferably made large enough to view the cream in an otherwise opaque container.

Both the cellulose material and paper board are relatively cheap compared to glass or metal, materials now commonly used for consumer liquids such as oil, beer, and milk. By combining cellulose material and paper in the manner set forth above, I provide an ideal container for such liquids which is less expensive than glass or metal and which is disposable by burning after use. While my container is especially well adapted for consumer liquids, it of course may be used for solids such as tea, coffee, cocoa and other things, and especially those things best preserved in an air tight container.

I claim:

1. A container comprising a paper board blank conformed to provide a container body having open ends and a wall opening, a coating film of regenerated cellulose material covering the inner and outer surfaces of said container body, and container end members of transparent cellulose material closing the open ends of said container body, the cellulose material of said end members being integrally united with the cellulose material of said coating film on said container body, and a closure patch sealing said wall opening, the transparency of said container end members permitting an "X-ray" inspection of the contents of the container.

2. A container comprising a paper board blank conformed to provide a container body having open ends, a coating film of regenerated cellulose material covering the inner surfaces of said container body, and container end members of transparent cellulose material closing the open ends of said container body, the cellulose material of said end members being integrally united with the cellulose material of said coating film on said container body, the transparency of said container end members permitting an "X-ray" inspection of the contents of the container.

3. A container comprising a tubular container body of paper board having open ends, a coating film of cellulose covering the inner and outer surfaces of said container body, and container end members of transparent cellulose closing the open ends of said container body, the cellulose of said end members being integrally united with the cellulose of said coating film on said container body, and the transparency of said container end members permitting the inspection of the contents of the container.

4. A container comprising a tubular container body of paper board having open ends, a coating film of cellulose covering the inner and outer surfaces of said container body, and container end members of cellulose closing the open ends of said container body, the cellulose of said end members being integrally united with the cellulose of said coating film on said container body.

5. A container comprising a tubular container body having open ends, a coating film of cellulose covering the inner surfaces of said container body, container end members of cellulose closing the open ends of said container body, the cellulose of said end members being integrally united with the cellulose of said coating film on said container body.

6. A container comprising a container body of fiber board having a window therein permitting an inspection of the contents of the container, a pane of transparent cellulose material filling said window, and a coating film of cellulose material covering the inner and outer surfaces of said container body and merging into the cellulose material of said pane.

7. A paper container for liquids such as oil, beer, milk or the like, comprising a fiber sheet conformed to provide a tubular container body having open ends, and a film of transparent cellulose material covering the inner and outer surfaces of said container body and merging into closure panes at the ends thereof.

8. A container comprising a tubular container body having open ends, a coating film of cellulose covering the outer surfaces of said container body, container end members of cellulose closing the open ends of said container body, the cellulose of said end members being integrally united with the cellulose of said coating film on said container body.

HAROLD D. SCHRIER.